United States Patent [19]
Mack et al.

[11] 4,087,680
[45] May 2, 1978

[54] SEMIAUTOMATIC CREDIT CARD INFORMATION HANDLING APPARATUS

[75] Inventors: Ronald H. Mack, Plymouth; Donald L. Bumgardner, South Lyon, both of Mich.

[73] Assignee: Burroughs Corporation, Detroit, Mich.

[21] Appl. No.: 789,946

[22] Filed: Apr. 22, 1977

[51] Int. Cl.$^2$ .............. G06K 7/08; G06F 7/02; G11B 25/04
[52] U.S. Cl. .................. 235/449; 235/419; 360/2
[58] Field of Search .............. 235/61.11 D, 61.11 E, 235/61.7 B, 61.12 M, 61.11 R; 200/46; 340/149 A, 152 R; 194/4 R; 250/569; 360/2, 71; 35/35 R, 35 J; 346/74 MP

[56] References Cited
U.S. PATENT DOCUMENTS

| | | | |
|---|---|---|---|
| 3,419,710 | 12/1968 | Mathews | 235/61.11 E |
| 3,708,790 | 1/1973 | Nourigat | 346/74 MP |
| 3,731,061 | 5/1973 | Laybourn | 235/61.11 D |
| 3,885,132 | 5/1975 | Luoma | 235/61.11 R |
| 3,893,182 | 1/1975 | Schmidt | 360/2 |

Primary Examiner—Robert M. Kilgore
Attorney, Agent, or Firm—Carl Fissell, Jr.; Edward J. Feeney, Jr.; Kevin R. Peterson

[57] ABSTRACT

A semiautomatic free standing credit card information handling apparatus comprising a rectilinearly movable carriage supporting read/write means slidably movable across the face of a vertically disposed information bearing credit card in read/write registry therewith. Means is provided for flattening the credit card each time the apparatus is initialized for a read/write operation effective to maintain the read/write means in constant contact with the information storage portion of the card. Oppositely disposed magnet means indicate the limit of travel right and left of the read/write means. Solenoid operated interlock means including manual initiate and override means operable in conjunction with cam means engageable by the credit card enable and disable the apparatus and concurrently prevent removal of the card prior to the termination of the read/write cycle of operation.

10 Claims, 7 Drawing Figures

SEMIAUTOMATIC CREDIT CARD INFORMATION HANDLING APPARATUS

BACKGROUND OF THE INVENTION

1. Field of the Invention

The invention relates to apparatus for reading information from or writing information upon an information bearing credit card or the like and more particularly the invention relates to such apparatus which is semiautomatic in operation.

2. Description of the Prior Art

Devices which read information from and write information upon credit cards and the like have a basic requirement, due to the utilization of modern, sophisticated reading and writing codes, that the relative velocity between the read/write head and the credit card be controlled and fixed at a definite speed. Of paramount importance therefore to the efficient use of such apparatus is the requirement that the read/write head remains in complete contact with the magnetizable portion of the credit card throughout the reading and/or writing operation. If this condition is not met and/or controlled, the head output signal is measurably reduced and the accuracy of reading or writing is deleteriously affected or perhaps even destroyed.

SUMMARY OF THE INVENTION

It is an important object therefore of the invention to provide semiautomatic credit card information handling apparatus which maintains the card in a completely flat relationship with respect to the read/write head during relative movement therebetween.

Another important object of the invention is to provide semiautomatic credit card information handling apparatus wherein constant contact is maintained between the read/write head and the credit card.

Still another important object of the invention is to provide credit card read/write apparatus wherein interlock controls are provided effective to avoid accidental dislodgement or removal of the card during the reading or writing stage and wherein the card must be properly and accurately aligned with the read/write head prior to the reading or writing operation, avoiding misreading or writing or inaccurate or partial reading of the information contained on the card.

These and other objects and advantages of the present invention are achieved by free standing semiautomatic credit card information apparatus utilizing a rectilinearly movable carriage flexably supporting read/write means adapted to be slidably moved across the information receiving area of a vertically oriented information bearing credit card or like device in read/write registry therewith. Oppositely disposed magnet means in the path of movement of the read/write means indicate the limit of travel of the latter. Means is provided for flattening the credit card each time the apparatus is initialized for a read/write operation effective to maintain the read/write means in constant contact with the information storage portion of the card. Solenoid actuated interlock means including manual initiate and override means operable in conjunction with cam means engageable by the credit card enable and disable the apparatus and concurrently prevent removal of the card prior to the termination of the read/write cycle of operation.

Other objects, features and advantages of the present invention will be readily apparent from the following detailed description when considered in light of the accompanying drawings, which illustrate by way of example, and not limitation, the principles of the invention and preferred modes for applying these principles.

DETAILED DESCRIPTION OF THE PREFERRED EMBODIMENT

Figure 1:
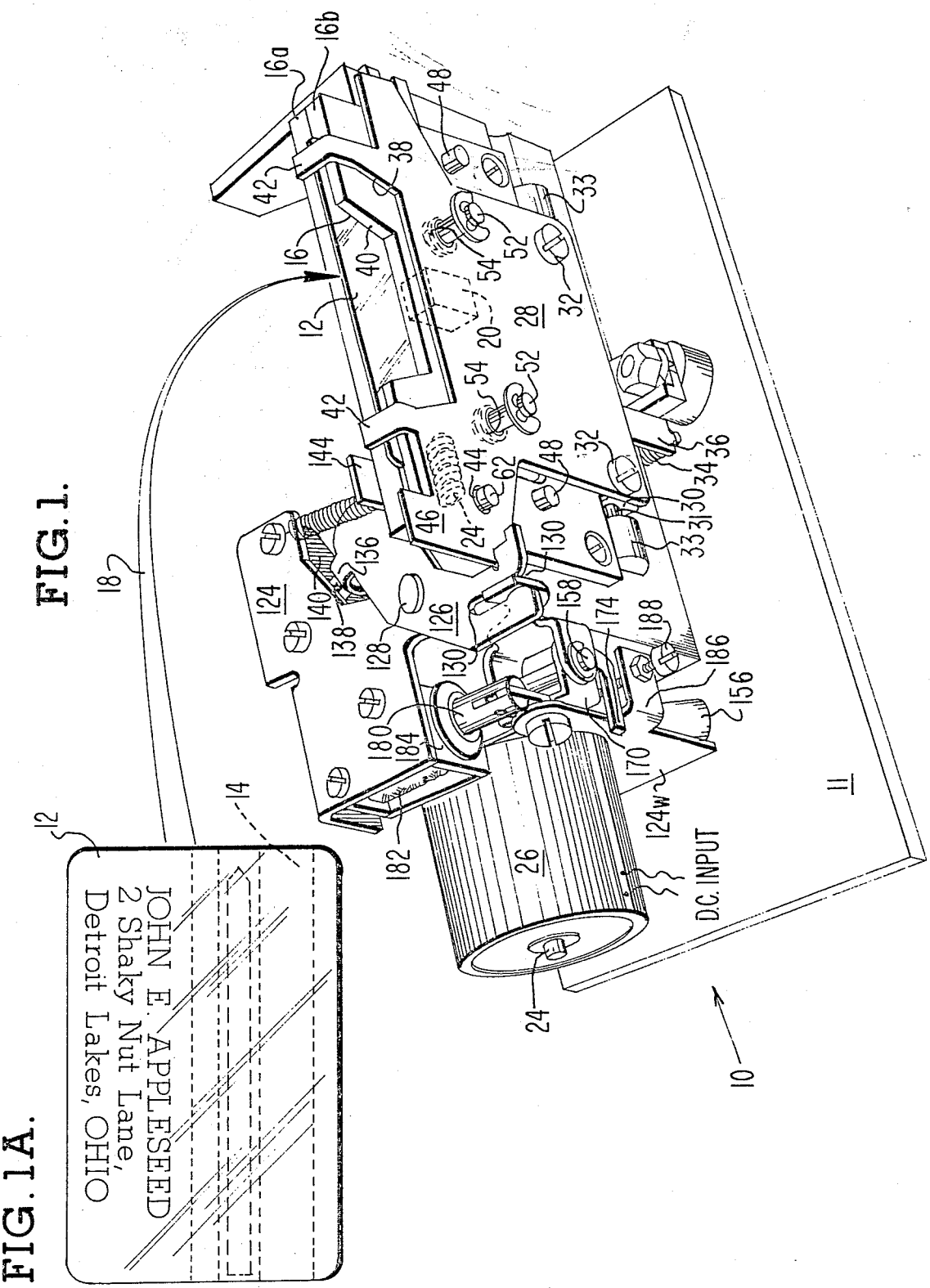
FIG. 1, including 1A, is a perspective view of an operational embodiment of the present invention.

Referring first to FIG. 1 there is shown read/write apparatus 10 including a base member 11 for reading information from and for writing information upon an information bearing member 12, such for example, as a credit card which carries on one side surface a magnetizable stripe 14 extending longitudinally, from edge to edge thereof, and on the opposite side one or more embossments, e.g., the name of the card holder, the card account number, the date of first and last use, etc. Other and additional areas may be employed on the card such for example as an area for the holder signature and/or an area indicating the direction of insertion of the card into other associated apparatus.

Figure 3:
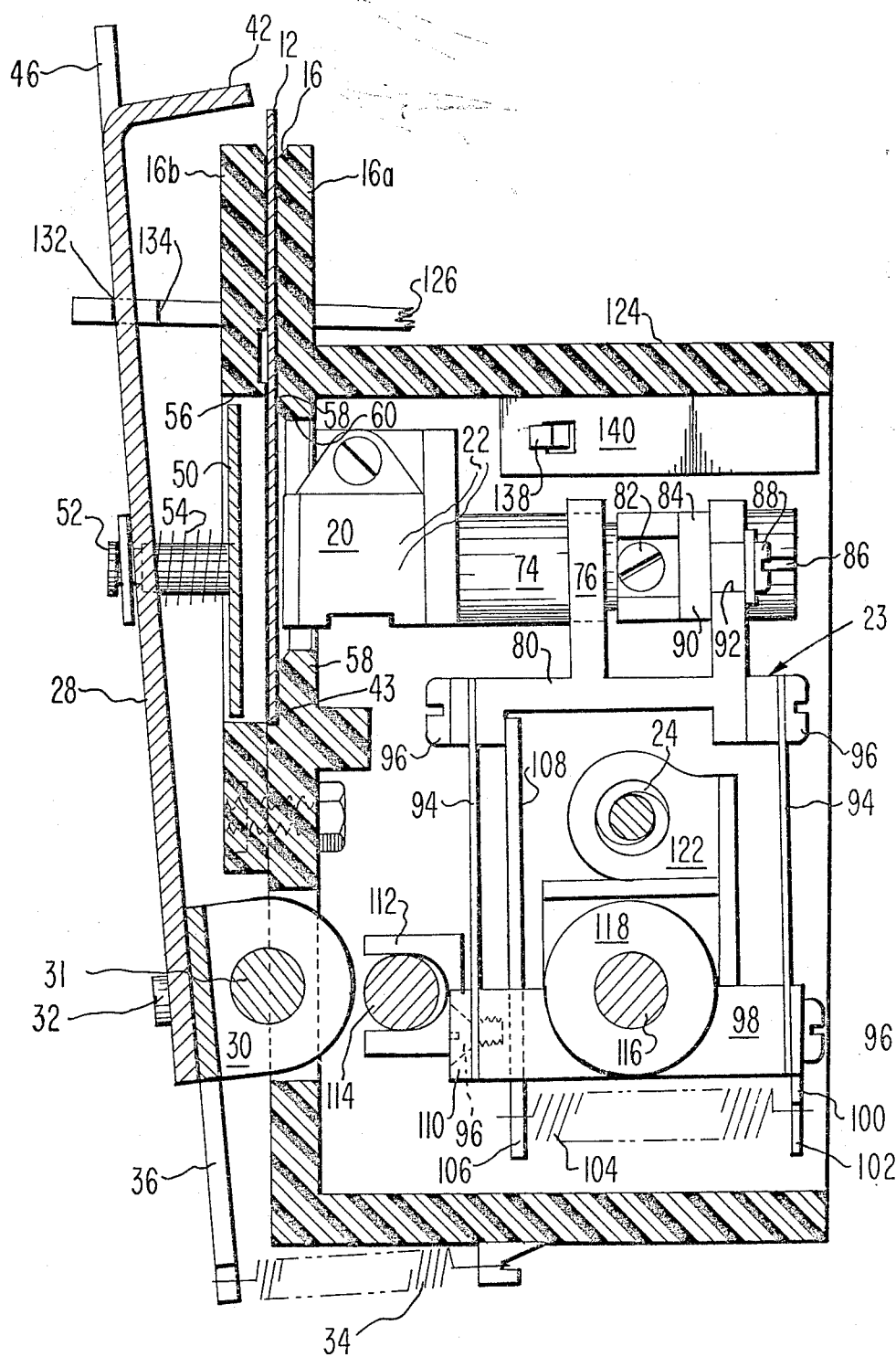
FIG. 3 is an elevational view partially in section along the line 3—3 of FIG. 2.

Card 12 is received within a throat 16 formed by the confronting frame members 16a and 16b seen most clearly in FIG. 3, with the magnetizable stripe 14 facing downwardly and to the rear of the apparatus in the manner and direction shown by the arrow 18 between FIGS. 1 and 1A.

Read/write transducer or head member 20 including electrical cable means 22, FIG. 3, for connection to associated apparatus, is flexibly spring mounted on carriage means 23 for linear movement (left and right as viewed in FIGS. 1, 2 and 4) along a helically threaded drive shaft 24 which is adapted to be rotated by reversible D.C. drive motor 26 energizes from a source of electrical current, not shown.

Figure 2:
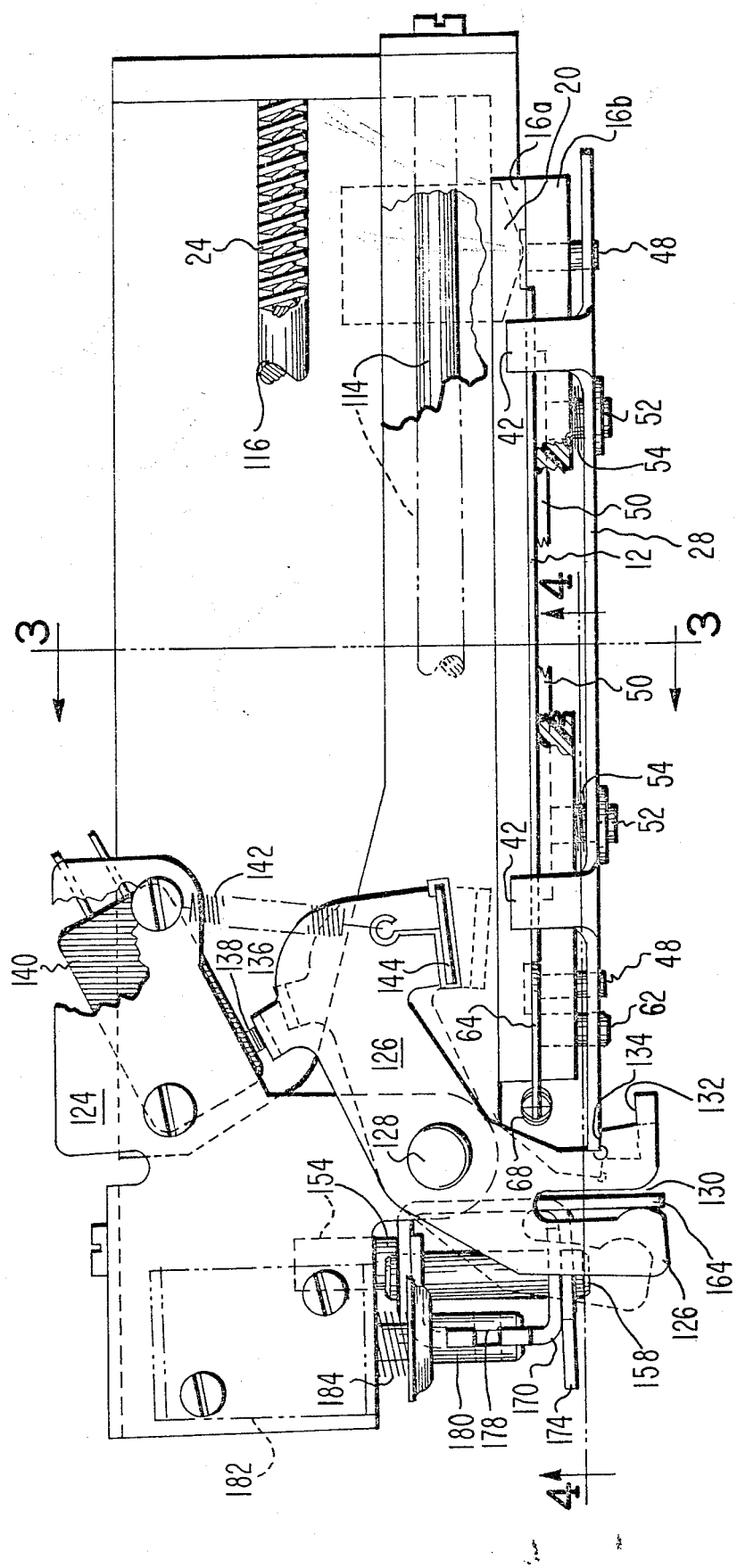
FIG. 2 is an enlarged to plan view of the apparatus of FIG. 1.
Figure 4:
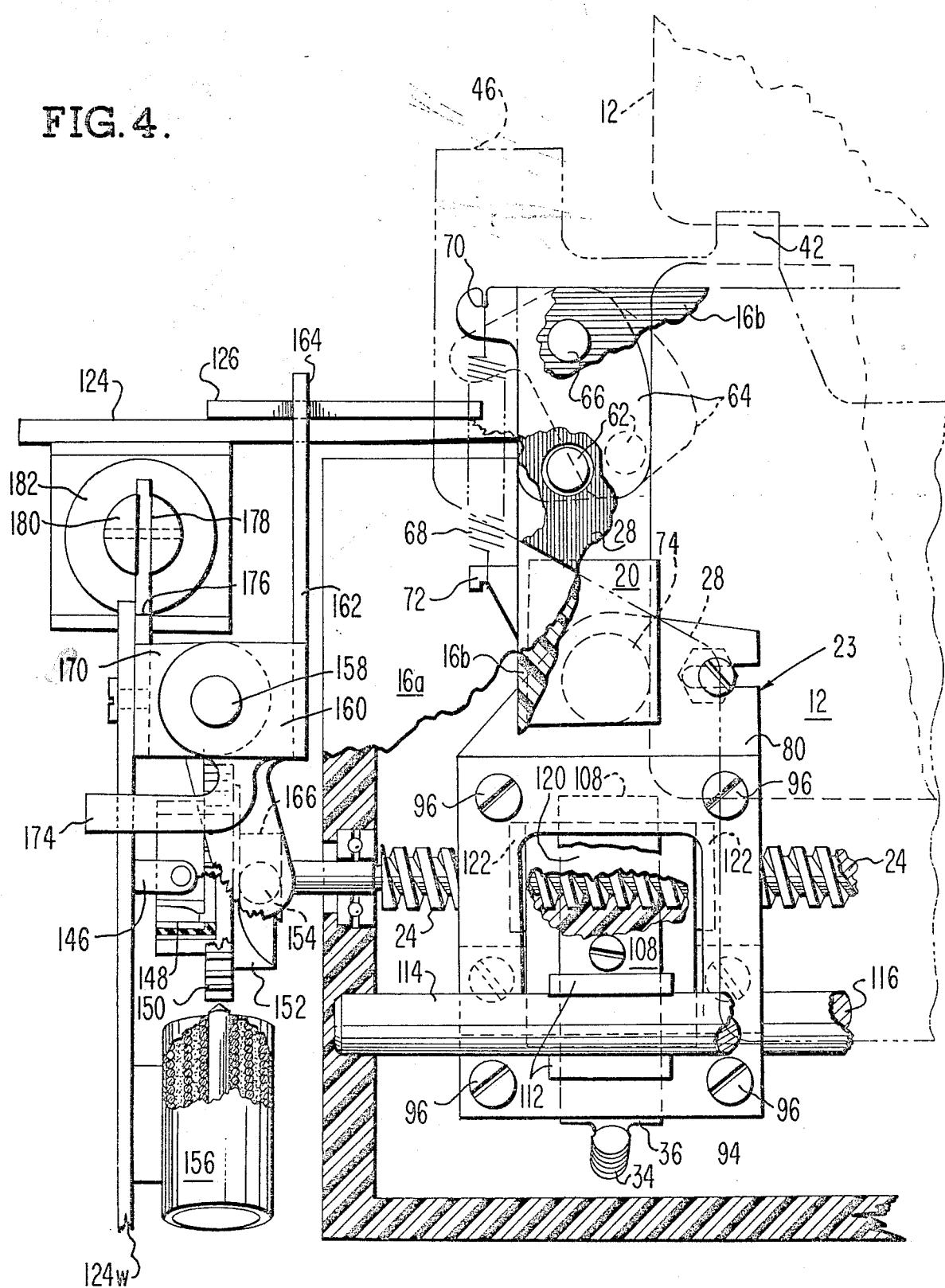
FIG. 4 is a partial sectional front elevational view along the line 4—4 of FIG. 2.

In order to assure positive alignment of the magnetizable stripe 14 of card 12 with read/write head 20 and to retain the card against accidental removal or dislodgement, the front of the apparatus as viewed in FIGS. 1, 2 and 4 is provided with an irregularly shaped flat rigid plate-like door member 28 of metal or plastic, pivotally hinged at the bottom thereof by means of two oppositely disposed hinge members 30—30 and secured to the frame members 16a, 16b by means of bolts 32 which attach the hinge members to an elongated shaft 31 extending between oppositely disposed supports 33. A spring 34 secured to a depending tab 36 biases the plate 28 away from the front facing wall surface 16b. The upper edge portion of plate 28 is provided with a clearance cutout or notch 38 adjacent to a clearance opening or notch 40 in the front wall 16b. The two openings together provide operator clearance for insertion of the credit card into the throat 16. Plate 28 carries a pair of oppositely disposed tangs or tabs 42 bent over substantially at right angles to the plane of the plate 28 with a slight upward cam angle (as seen in FIG. 3) effectively acting to cam the credit card 12 downwardly into throat 16 when plate 28 is pivotally moved from the full "open" position of FIG. 3 to the fully "closed" position of FIGS. 1 and 2. The card is received against reference edge 43, FIG. 3, when it bottoms fully within throat 16.

The far left end portion of the plate 28 is perforated to form an aperture as at 44 for purposes to be described shortly, while the upper end portions thereof terminates in an upstanding projection 46 forming means to move the plate 28 toward the credit card for purposes to be described hereinafter.

Left and right read/write head carrier position logic signals are adapted to be generated by oppositely disposed small magnetic members 48—48 disposed in line with and in the path of carriage 23 and movement of the read/write means 20 and located flush with the inside wall surface of the front throat forming member 16b. Read/write means 20 is obliged to pass over members 48 and through the magnetic field generated thereby effectively producing an output in the read/write means 20 without the requirement for additional transducer member. Magnets 48—48 also act in the nature of limit switch devices in that the position of the magnets by generating a signal output as the read/write head passes thereover effectively indicate the position of the head whether at the start or home position or at the end or terminal position along the length of the drive screw 24 (left or right, respectively, as viewed in FIGS. 1 and 2).

Plate 28, which acts in the nature of a door having an "open" and a "closed" position, as will be explained presently, carries on its inner surface a rigid, elongate, flat member 50, FIGS. 1, 2 and 3, resiliently mounted thereto by means of bolts 52 and springs 54. Member 50 is adapted to project through opening 56, FIG. 3, in front wall 16b so as to press inwardly against credit card 12 when the plate member 28 is rocked forwardly by the operator through the medium of the tab 46. This action tends to flatten the credit card 12 against the inner edge 58 surrounding the opening 60 in wall member 16a to bring the magnetizable stripe 14 on the card into contact with the active gap area of the read/write means 20.

A stud 62, FIGS. 2 and 4, which is carried by an irregularly shaped cam member 64 and rotatable about fixed pivot 66 secured to rear wall forming member 16a is adapted to project through aperture 44, as will be described shortly. A spring 68, secured at one end to a hook 70 on cam member 64 and at its other end to hook 72 on wall member 16a, biases the cam member 64 rightwardly, i.e., into the path of the credit card 12 as the card is inserted into throat 16. Movement of card 12 downwardly so as to cause the card to bottom in throat 16 causes cam 64 to move from right to left (from the dotted to the full line position, FIG. 4). This movement of the card aligns the stud 62 with aperture 44 in front plate 28 permitting the plate 28 to move arcuately forwardly (to the "closed" position) bringing the pressure plate 50, carried thereby, into engagement with the credit card 12 pressing the card forwardly flattening the card within the throat 16.

The read/write head 20 is mounted to a rigid, non-magnetic support member 74 part of carriage 23, FIG. 3, e.g. aluminum or some other similar material, which is slidably receivable through oppositely disposed vertical bearing blocks 76 and 78 integral with an upper head support mounting member 80. Screw 82 receivable through member 84 and engageable with keyway 86 permits longitudinal adjustment of the head support 74 toward and away from the credit card throat apertures 56 and 60. Screw 88 engageable with member 90 through aperture 92 enables the head to be secured in the desired position after suitable adjustment relative to the credit card magnetic stripe 14.

In order to obtain a clear, clean, crisp and undistorted output signal of high level, it is essential to the proper reading and writing operation of the present apparatus that the head 20 remain relatively rigid with respect to the magnetic stripe 14 while at the same time being able to follow any longitudinal undulations of the stripe as the head is moved thereacross.

The lead screw or helix 124 enables the head to be shifted across the stripe 14 at relatively high speed effective to produce a relatively uniform signal output from one end of the card to the other (the card is read in the vertical position as seen in the drawings).

The upper head support mounting member 80, as seen most clearly in FIGS. 3 and 4, is secured by means of opposite pairs of flexible elements 94—94 and bolts 96 to a lower head support mounting member 98. A lower rear cross-tie member 100, FIGS. 3, is provided with a tab portion 102 depending therefrom. A spring 104 is secured at one end to the tab 102 while the opposite spring end is attached to a tab 106 on a vertical spring biasing member 108, FIGS. 3 and 4. A lower front cross-tie member 110 is provided with an outwardly projecting U-shaped bearing member 112 which is adapted to straddle an elongated, longitudinally arranged front guide rod or shaft 114 extending from left side to right side of the apparatus as viewed in FIG. 1. Substantially parallel to guide rod 114 and arranged directly beneath the helical drive screw shaft 24 is a support shaft 116 extending in sliding engagement through a bearing member 118 integral with the lower head support mounting member 98. The helical drive shaft 24 is operatively threadedly engaged in a threaded block 120 (FIG. 4) fixedly supported between parallel arms 122—122 integral with the rear cross-tie member 100.

Energization of motor 26 will rotate shaft 24. Since the head 20 is fixed to the mounting support which is secured to the threaded block, relative movement between the shaft and the block will cause the head structure to move longitudinally along the shaft 24 carrying the head across the magnetic stripe 14 on card 12. Since the flattening member 50 forces the card toward the head while the biasing member 108 forces the head in the reverse direction against the stripe on the card, the head will follow the card surface as precisely as possible with no air gap therebetween effectively producing a maximum, usable signal output from the stripe 14.

The handling of data involving credit cards often falls to the lot of relatively unskilled personnel. Cards may be lost, the magnetic stripe may be damaged or destroyed and sometimes the same card is processed twice for different account numbers. These and other actions require that the credit card reader/writer apparatus be as "foolproof" as possible so that relatively little area is left for accidents or carelessness. To this end, the present invention incorporates a number of interactive interlock mechanisms which act both to enable as well as to disable the apparatus depending upon the instantaneous status thereof.

Pivotally mounted on an irregularly shaped support member 124 secured to the base structure of the apparatus is an arcuately bent actuator link 126 rotatable about pivot 128, FIGS. 1 and 2. The forward end of link 126 is notched as at 130 with one fork of the notched end being provided with two step-like indentations 132 and 134, FIG. 2, engageable with the leftward upper end of plate 28. The rearward end of link 126 has a bent over tang or tab 136 depending downwardly therefrom so as to engage the actuating element 138, FIGS. 1, 2 and 5, of microswitch 140 secured to the support member 124. As will appear more clearly in connection with the description of the operation of this apparatus, microswitch 140 is characterized as a "door closed" (plate or door 28) "card in black" (card 12) switch. A spring 142 attached at one end to member 124 and at its opposite end to upstanding integral tab 144, bent up from the link 126, biases the link in a rearward direction, FIG. 1 (counterclockwise in FIG. 2). The upstanding tab 144 acts as a release mechanism as will become more clear as the description proceeds.

Support member 124 extends downwardly at the rear of the apparatus and is bent at right angles thereto forwardly, FIG. 1, to form a left hand support wall 124w for drive motor 26 which is attached thereto by bolts so that the motor drive shaft 146 extends rightwardly (FIG. 4) into a relatively soft resilient coupling member 148. Coupling 148 functions to accommodate any misalignment between the output shaft or motor and the helical drive screw shaft 24. A master wheel or timing gear 150 surrounds the coupling member in press fit engagement therewith and is secured to and rotates with helical drive shaft 24. An actuating cam 152 mounted on the rightward hub of timing gear 150, FIG. 4, is adapted to engage a follower roller 154 for purposes still to be described. Angularly disposed beneath the timing gear is a timing solenoid or transducer 156. Transducer 156 is or may be an electromagnetic member having a magnetizable core surrounded by a multiturn coil as seen diagrammatically in FIG. 4. The inward angled end of this device is arranged adjacent to the rotatable teeth of gear wheel 150 with a slight air gap therebetween. The distance between teeth on wheel 150 represents the placement of the information data bits on card 12 when a writing operation is performed. This provides dimensional control over the data as written on the card. As the wheel rotates, the teeth cut the lines of force produced by the coil generating an electrical signal output which is utilized by associated logic (not shown) to provide the timing required for the apparatus.

Rotatably mounted on a pivot shaft 158, FIGS. 1, 2, 4 and 5, by means of the parallel arms of yoke 160 is an irregularly shaped member 162 the vertically projecting portion 164 of which extends within the forked forward end of member 126. The inboard portion of member 162 is provided with a downwardly extending leg 166 terminating in a forwardly bent tab 168, FIG. 5. Extending rearwardly from downward leg 166 is follower roller 154 earlier mentioned herein engageable with cam 152.

Pivot shaft 158 is carried by a yoke member 170 rockably, pivotally, disposed on a bolt 172 extending through wall 124w. The front arm portion of yoke 170, as viewed in FIGS. 1, 2 and 4, is bent to form a stop 174, FIG. 4, abuttable against the edge of the support wall 124w. A vertically extending integral portion 176 of member 170 engages a slot 178 in the bifurcated end of plunger 180 of solenoid 182, the latter being secured by bolts to the member 124 as seen in FIGS. 1, 2, 4 and 5. A cross pin retains the portion 176 within the slot in plunger 180.

Figure 5:
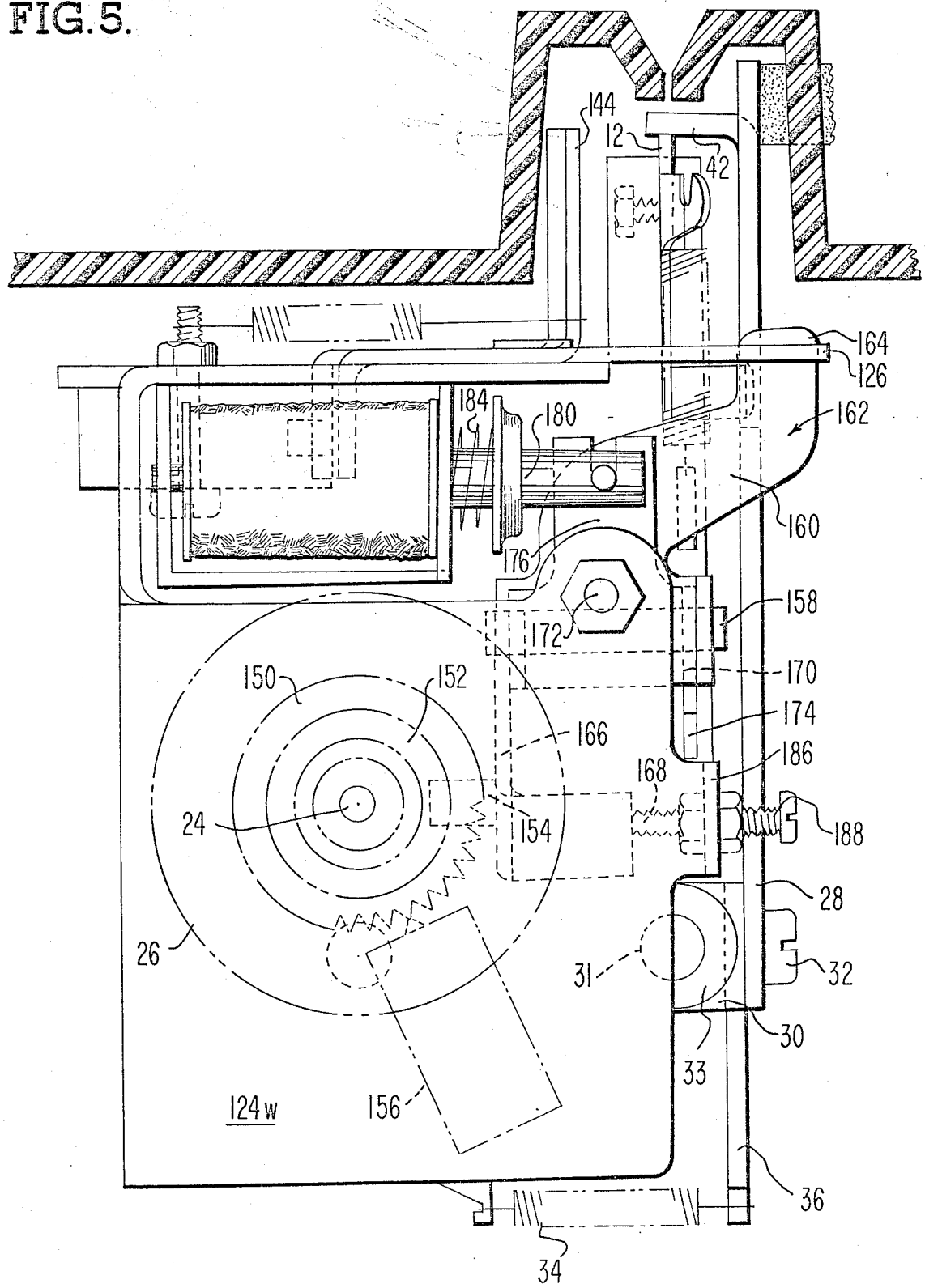
FIG. 5 is a left side elevational view of the apparatus of FIG. 1.
Figure 6:
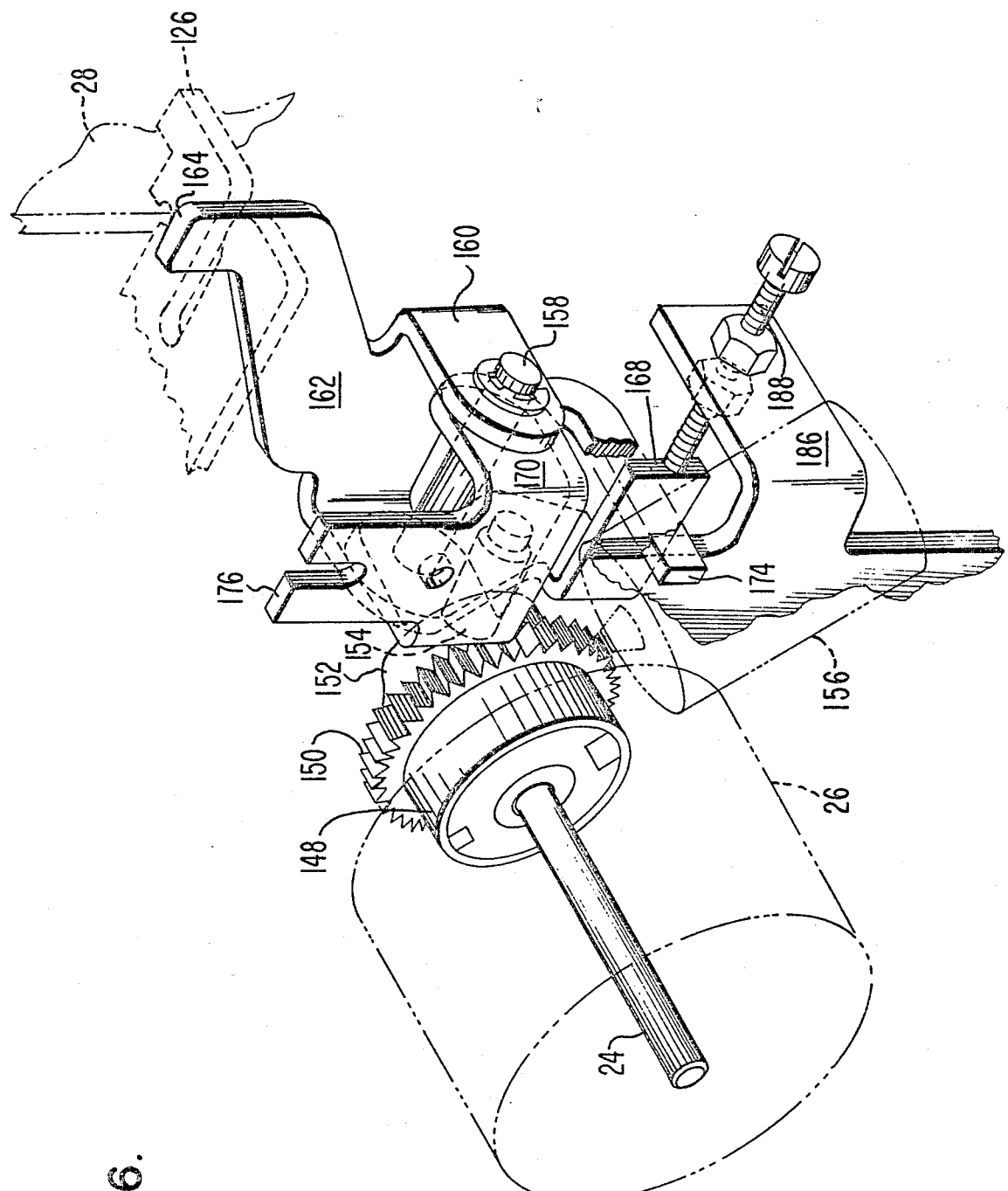
FIG. 6 is a perspective view of the interlock linkage and cam assembly of the present invention.

A spring 184 biases the solenoid plunger 180, rightwardly, FIG. 5, forcing the stop 174 into contact with the vertical edge of wall 124w. A right angle tab 186, FIG. 1, bent out of the plane of member 124w and integral therewith is provided with adjustable stop member 188 which is adapted to contact the forwardly extending tab 168 of the depending portion of member 162 when plate 28 is in the full forward "open" position.

OPERATION

The operator inserts an item to be read, e.g. credit card 12 bearing a magnetizable stripe 14 on one surface thereof into throat 16, FIGS. 1, 2, 3 and 4, of the apparatus 10. Cam 64 is moved leftwardly by the card rotating pin 62 from its interfering or blocking position (dotted outline FIG. 4) to a position enabling the operator to push the finger projection 46 forwardly permitting the pin 62 to align with and penetrate the aperture 44 in front plate 28 (full line position FIG. 4). Plate 28 cannot be moved forward to the operative position unless or until a card is in the slot-throat 16 since the stud or pin 62 acts as a stop against plate 28. As plate 28 moves forward against the tension of spring 34, the two oppositely disposed tabs or tangs 42—42 act to cam the card downwardly into the throat 16 to bottom therein against the reference edge 43. Movement of the front plate 28 forwardly causes latch member 126 to rotate counterclockwise about point 128 bringing depending tab 136 into contact with switch actuator 138 closing card and door microswitch 140. A card present and plate closed signal is now generated by this mechanism which also applies operating potential to energize D.C. motor 26.

The forward movement or closure of plate 28 with a card in the slot or throat 16 causes latch 126 to move from the dotted to the full line position of FIG. 2 so that the latch 126 locks plate 28 against accidental opening movement. The plate 28 can of course be moved or opened manually by the operator pulling tab 144, FIGS. 1, 2 and 5 forwardly which reverses the previously described movement and causes the latch 126 to move clockwise away from the plate 28 permitting plate 28 to be spring driven by spring 34 to an "open" position (FIG. 3). With the apparatus in the "closed" and locked position electrical potential is applied to the D.C. motor 26 (i.e. D.C. input) which rotates the helical drive shaft 24 and actuates the read/write head 20. Movement of the head structure 20 along the helical lead screw 24 permits the head to read from or write upon the magnetic stripe 14 as desired.

An electrical interlock control and automatic plate release is provided by means of solenoid 182 and its associated linkage. The locking blank member 162, FIGS. 4 and 5, is adapted to rotate about two pivotal centers formed by shaft 158 and bolt 172, respectively. Member 162 thus partakes of a side to side or lateral movement, as viewed in FIGS. 1, 2 and 4, and a rocking movement, as viewed in FIGS. 4 and 5. With a card 12 in place or present and with the door or plate 28 closed, logic (not shown) causes solenoid 182 to be picked. The D.C. motor is energized and the head mechanism is moved by the helical screw thread across the stripe 14 of card 12. Blank 162 is rocked into interfering position with the link 126 so that the card 12 is effectively blocked against removal, i.e. locked in place in throat 16. When solenoid 182 is "picked" or pulled in, i.e. plunger 180 retracted, member 162 rotates about bolt 172 so that projection or tang 168 passes in line with adjustable stop 188 effectively preventing member 162 from rotating about 158. This will prevent latch 126 from rotating and opening the plate 28, that is, pushing the plate 28 to the "open" position. Should a power failure or a jam occur, solenoid 182 will drop out or release. Spring 184 will force the plunger out of the solenoid coil so that member 162 now rotates about member 172 whereupon cam roller 154 moves into the path of cam 152 on drive shaft 24. Rotation of cam 152 is effective to move follower 154 rightwardly, FIG. 4, so as to drive member 162 leftwardly which unlatches plate 28 and places the apparatus in the "open" position, FIG. 3, once again enabling the operator to retrieve card 12.

What is claimed is:

1. Free standing apparatus for automatically reading information from or writing information upon an information bearing credit card comprising:
   1. a base member;
   2. carriage means including signal generating read/write means slidably mounted relative to said base member for movement along a linear path with respect to said base member;
   4. means in the path of movement of said read/write means operable to indicate the origination and termination of movement of said read/write means;
   5. means operably associated with said base member and said credit card supporting means for accurately locating said card relative to said read/write means effective to initiate read/write operation;
   6. means conjointly movable with said card locating means for flattening said card and locking the card against dislodgement or accidental removal;
   7. means for timing the read/write operation to enable the automatic disposition of information relative to said credit card; and
   8. drive means operably interconnected with said timing means for moving said read/write means relative to said credit card effective to produce a signal in said read/write means characteristic of information carried by said card.

2. The invention in accordance with claim 1 wherein said read/write means is flexibly suspended with respect to said drive means permitting said head to follow and precisely track the information bearing portion of said credit card as the read/write means passes across the surface thereof.

3. The invention in accordance with claim 1 wherein said means for moving said read/write means comprises an elongated threaded member along which said read/write means is caused to move in a linear fashion and a drive motor resiliently coupled to said threaded member.

4. The invention in accordance with claim 1 wherein said base member is provided with electromechanical interlock means preventing the accidental or inadvertent actuation of said drive means effective to prevent reading from or writing upon said credit card without positive engagement of said interlock means.

5. The invention in accordance with claim 4 wherein said interlock means further includes manual override release means for disabling said interlock means permitting removal and reinsertion of a credit card into said apparatus.

6. The invention in accordance with claim 1 wherein said means for flattening said credit card effective to prevent the read/write means from inaccurately tracking the information carrying portion of the card as the result of any unevenness or warping in the card due to embossing or handling thereof includes a resiliently mounted rigid plate-like member.

7. The invention in accordance with claim 1 wherein said origination and termination means comprises oppositely disposed magnetic members located in the path of movement of said read/write means effective to produce a flux change in said read/write means signaling the initiation and termination of the read/write cycle of operation.

8. The invention in accordance with claim 4 wherein said electromechanical interlock means also includes solenoid means and interference means mechanically interconnected with and operable by said solenoid means and movable into and out of juxtaposition with respect to said credit card effective thereby to prevent misalignment of removal of said credit card once the credit card has been positioned relative to the read/write means.

9. The invention in accordance with claim 8 wherein said interference means further includes a cam member operably engageable with said credit card and having a projecting stud adapted to extend through said interference means enabling said interference means to block removal of said credit card and to concurrently initiate a read/write operation.

10. The invention in accordance with claim 1 wherein said base member is provided with a slit-like throat or aperture for receiving said credit card and wherein said throat is open on two sides effective to receive said card flattening means on one side and said read/write means on the opposite side and wherein said interference means further comprises a flat plate pivotally hinged to said base member to which said flattening means is resiliently mounted and having oppositely disposed tangs projecting outwardly away therefrom so as to overlie said credit card when the card is fully within said throat.

* * * * *